Dec. 18, 1945.  E. MARTIN  2,391,323
POWER PLANT CONTROL MEANS
Filed Feb. 9, 1942  2 Sheets-Sheet 1
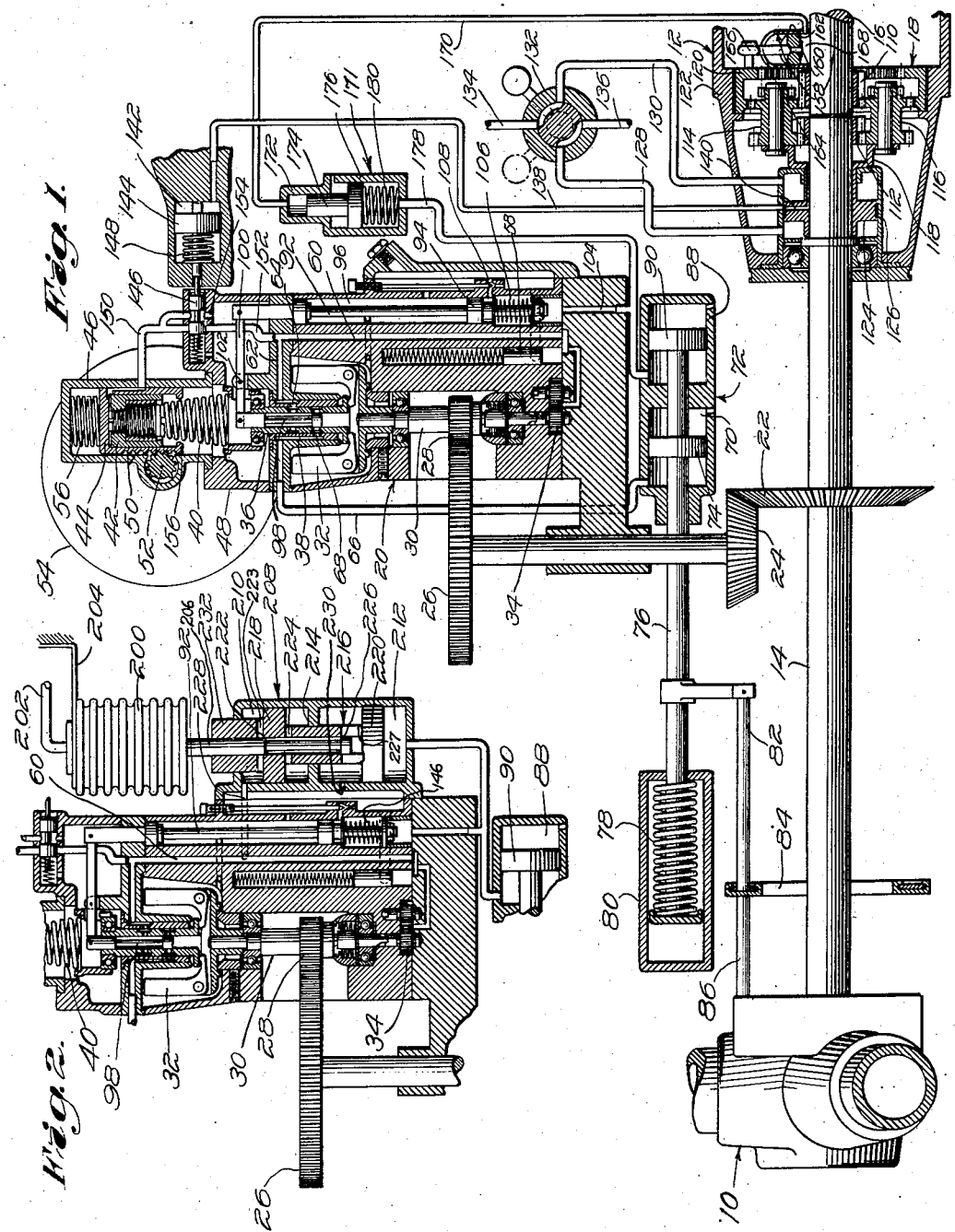
INVENTOR
*Eric Martin*
BY *Harris G. Luther*
ATTORNEY Dec. 18, 1945.   E. MARTIN   2,391,323
POWER PLANT CONTROL MEANS
Filed Feb. 9, 1942   2 Sheets-Sheet 2
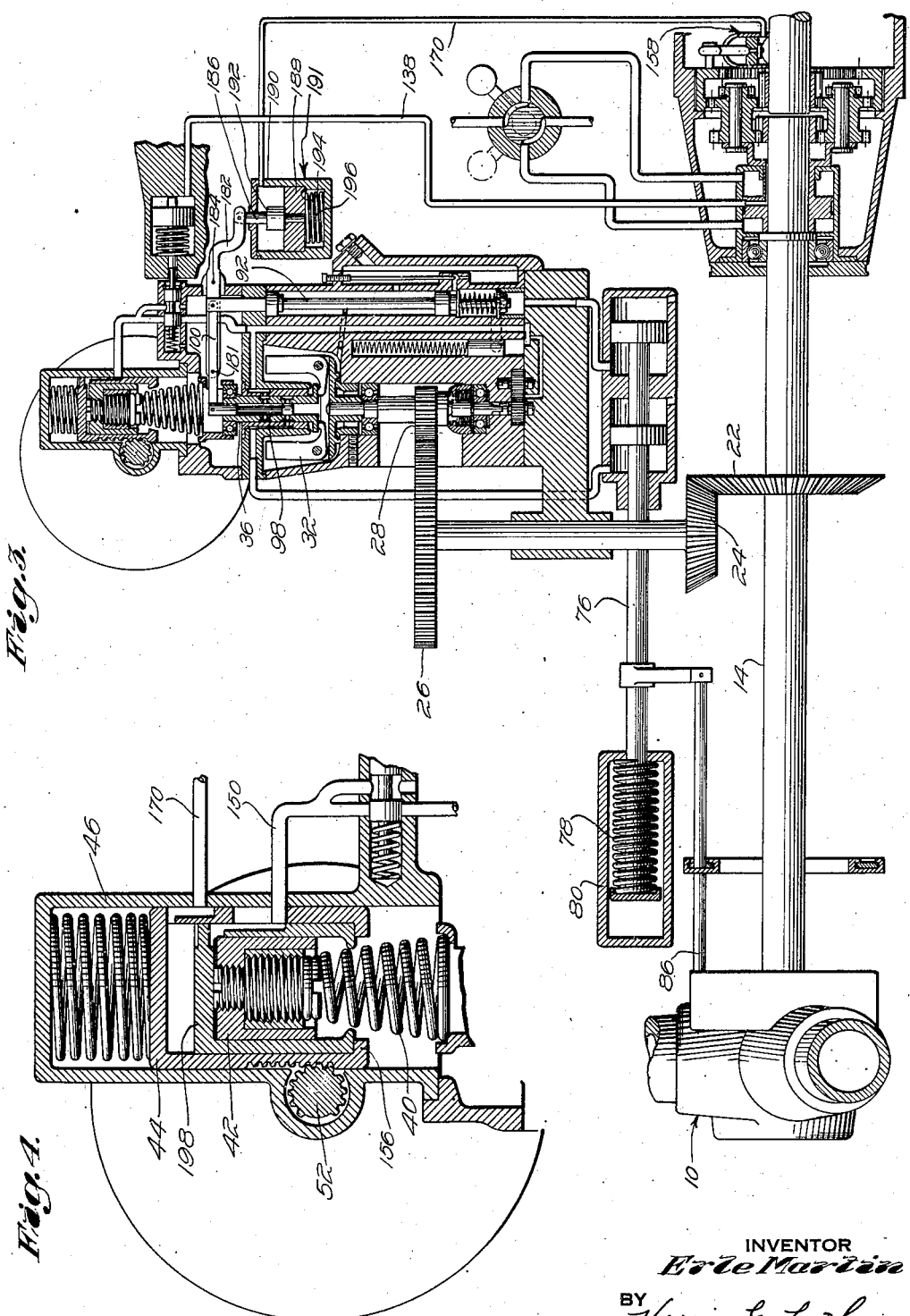
INVENTOR
Erie Martin
BY
Harris G. Luther
ATTORNEY Patented Dec. 18, 1945

2,391,323

UNITED STATES PATENT OFFICE 2,391,323

POWER PLANT CONTROL MEANS

Erle Martin, West Hartford, Conn., assignor to United Aircraft Corporation, East Hartford, Conn., a coporation of Delaware Application February 9, 1942, Serial No. 430,095

18 Claims. (Cl. 170—135.6)

This invention relates to improvements in power plant control means and has particular reference to an improved control means for a power plant such as the propulsive power plant of an aircraft including a controllable-pitch propeller and a propeller driving engine.

An object of the invention resides in the provision of an improved power plant control operative to prevent overspeeding of the power plant and particularly overspeeding incident to changes in power plant operation.

A further object resides in the provision of an improved power plant control means of the character indicated which is responsive to power plant operating conditions tending to result in excessive power plant speed and which is effective to take anticipatory speed reducing action before the condition actually results in overspeeding of the power plant.

Other objects and advantages will be more particularly pointed out hereinafter or will become apparent as the description proceeds.

In the accompanying drawings, in which like reference numerals are used to designate similar parts throughout, there is illustrated in several slightly modified forms a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings, Fig. 1 is a diagrammatic sectional view through a power plant control constructed according to the invention.

Fig. 2 is a diagrammatic sectional view through a fragmentary portion of the power plant control shown in Fig. 1, showing a somewhat modified form of control means constructed according to the invention.

Fig. 3 is a diagrammatic sectional view similar to Fig. 1 showing a still further modified form of control means constructed according to the invention, and Fig. 4 is a sectional view of a fragmentary portion of the power plant control means showing a further modification of the portion illustrated.

Airplanes are, in some cases, subjected to maneuvers sufficiently violent so that the usual centrifugal type propeller governor for maintaining the power plant speed substantially constant is unable to respond to propeller speed changes quickly enough to prevent dangerous overspeeding of the power plant. A contributing cause to this deficiency is that the conventional type centrifugal governor, without anticipatory devices, is incapable of correcting speed changes until after a definite speed change has occurred. Even after the governor has started to correct the speed, a definite, and sometimes excessive, time interval elapses before the propeller-governor combination can be actuated sufficiently to correct the speed variation. As an example, a propeller of the controllable-type is susceptible to overspeeding when engine power is regained after a temporary interruption. If, for instance, the airplane is put into a stall with the throttle closed, the propeller will move to an extreme low pitch condition in an effort to keep the speed constant. If now the airplane is put into a dive, or the engine throttle is suddenly opened, or both of these conditions occur, the propeller in low pitch will accelerate rapidly. The governor cannot act to check the increase in speed by increasing the pitch until the speed has reached the definite value for which the governor has been set. Moreover, after the governor has initiated the correction, a time interval occurs before the blade angle of the propeller can be increased sufficiently to check the speed. This time interval and the resulting overspeeding will, of course, depend upon the inherent rate of pitch change of the propeller but it is probable that some dangerous overspeeding would result from a maneuver such as that described, regardless of how fast, within practical limits, the propeller can change its pitch. The above described maneuvers are mentioned only by way of example and it will be obvious to those skilled in the art that various other operating conditions may involve a tendency towards excessive power plant speed.

It is among the objects of this invention to provide an improved power plant control which will be effective to prevent such overspeeding of the power plant by taking an anticipatory action to increase the pitch of the propeller blades a safe time interval before the pitch increasing action of the governor is begun. Such an improved power plant control has been illustrated in several slightly modified forms in the accompanying drawings to which reference may now be had for a detailed description of the construction and operation of the improved control apparatus.

Referring to the drawings in detail, the numeral 10 generally indicates a hydro-controllable aeronautical propeller supported and driven by an engine, generally indicated at 12. In the arrangement illustrated, the propeller is carried upon a propeller shaft 14 supported by the engine 12 and driven by an engine shaft 16 through a two speed change speed gear, generally indicated at 18. A governor, generally indicated at 20, driven from the shaft 14 by the gears 22, 24, 26 and 28 controls the speed of the power plant by changing the pitch of the propeller blades.

The gear 28 is on a shaft 30 which carries at one end a pair of governor flyballs 32 and at the other end a fluid pressure pump 34. The flyballs 32 act on one end of a slidable tubular valve plunger 36 reciprocable and rotatable in a relatively fixed valve sleeve 38, the action of the flyballs being opposed by a governor speeder spring 40 which bears at one end on the plunger 36 and at the opposite end on a movable piston abutment 42. The piston abutment 42 is carried in a cylindrical abutment 44 reciprocably mounted in a cylindrical extension 46 on the governor cap 48 and provided along one side thereof with rack teeth 50 engageable by the teeth of a pinion 52 rotatable by the manually movable lever or pulley 54 to change the speed setting of the governor. The force of the governor speeder spring acting on the cylindrical abutment 44 is at least partially counterbalanced by a compression spring 56 interposed between the closed end of the abutment 44 and the closed end of the cylindrical extension 46.

Fluid under pressure from the outlet of the pump 34 is led past a pressure relief valve 58, which regulates the pump outlet pressure to a predetermined value, to a fluid pressure line 60 connected through the channel 62 with a port 64 in the valve sleeve 38. A fluid line 66 leads from a port 68 in the valve sleeve to one end of an operating cylinder 70 of a servo-motor, generally indicated at 72. A piston 74 in the cylinder 70 is secured on a shaft 76 and urged in one direction by fluid pressure from the channel 66 and in the opposite direction by a compression spring 78 contained in a cylindrical casing 80. The shaft 76 is connected through suitable means, as diagrammatically indicated by the link 82, the slip joint 84 having relatively rotatable parts, and the link 86, with the propeller 10, which may be any suitable controllable-pitch propeller, to vary the pitch angle of the propeller in accordance with the movements of the piston 74 of the servo-motor.

For a more detailed description of a suitable propeller 10 and the control means therefor reference may be had to United States application Serial No. 422,252, filed December 9, 1941, by Donald W. Perin and Nelson R. Richmond, for Propeller control means, and assigned to the assignee of this invention.

The governor is provided with a compensating mechanism for stabilizing its operation and preventing overcorrection of the propeller pitch. This compensating mechanism includes a cylinder 88 on the servo-motor, tandem with the cylinder 70 and containing a reciprocable piston 90 mounted on an extension of the shaft 76, a compensating plunger 92 carrying a piston 94 and slidable in a cylindrical bore 96 and a pilot valve 98 reciprocable in the tubular governor controlled valve plunger 36 and connected to the plunger 92 by a lever 100 having a fixed pivotal support at 102. One end of the cylinder 88 is connected through the fluid channel 104 with the end of the bore 96 containing the plunger 92 so that when the piston 90 is moved to the left as viewed in Fig. 1 the piston 94 will be raised against the force of the compression spring 106 and when the piston 90 moves to the right the spring 106 will move the plunger 92 downwardly. This will cause the piston portion at the end of the pilot valve plunger 98 to follow the lower ports in the valve plunger 36 as this valve plunger is moved by the flyballs 32 and speeder spring 40, the action of the plunger 98 being to gradually restrict the connection between the governor operated valve and the servo-motor as the movement of the valve plunger 36 ceases, to slow the operation of the servo-motor as the propeller pitch approaches the angle corresponding to the change speed demand of the governor. Fluid from the space below the piston 94 may flow through the needle controlled bleed valve 108 to permit the plunger 98 to return to its neutral position at a predetermined rate after it has been displaced by movement of the piston 90.

Another way of expressing the action of this compensator would be to say that the plunger 98 determines the neutral position of the governor and movement of this neutral position really changes the speed setting of the governor. During pitch changing movements in which the propeller pitch is being increased, to reduce the engine speed because it is higher than the governor speed setting, the compensator piston 94 moves the plunger 98 and changes the neutral position of the governor to in effect increase the governor speed setting. This then means that after the propeller has begun to check the engine speed oil flow to the servo-motor 74 will be cut off or reduced while the governor still has a neutral position higher than normal. As the oil flow to the piston 94 decreases, due to slower movement of the servo-motor 74, the bleed 108 allows the piston to slowly return to its normal setting thus returning the governor to its normal setting. If the pitch setting is not already enough to hold the speed down to the normal speed setting the additional oil will gradually be admitted to slowly increase the propeller pitch as the piston 94 and plunger 98 return to normal and thus gradually approach the desired speed without overshooting.

The change speed gear unit 18 comprises a drive gear 110 on the engine shaft 16, a driven gear 112 on the propeller shaft 14, a plurality of planetary gears, two of which are indicated at 114 and 116, carried by a cage 118 concentrically supported on the shaft 14 and a double annular gear 120 fixed in the engine casing 122. The annular gear 120 has two sets of internal gear teeth of different diameter and each planetary gear has three sets of gear teeth at least two sets of which are of different diameters. One set of gear teeth of each planetary gear is constantly in mesh with the driven gear 112. A second set is constantly in mesh with the drive gear 110 and either one of two sets of gear teeth on the planetary gears may be alternatively engaged with a corresponding set of internal gear teeth in the ring gear 120 by longitudinal movement of the cage 118 and the planetary gears, to provide two different gear ratios between the drive shaft 16 and the driven shaft 14. The planetary gears have a neutral position in which none of the gear teeth thereon mesh with the teeth of the annular ring gear 120 in which position of the planetary gears there is no drive coupling between the shafts 16 and 14. The cage 118 and planetary gears are moved in gear shifting directions by a fluid motor comprising a piston 124 secured to the cage 118 and reciprocable in a cylinder 126 secured to the end of the engine casing 122. The opposite ends of the cylinder 126 are connected by the conduits 128 and 130 with a manually operable two-way valve 132 which is also connected with the fluid pressure line 134 and the drain line 136. When the valve 132 is in the position illustrated, the right hand end of the cylinder 126 is connected with the pressure line 134 and the left hand end will be connected with the drain line 136. When the valve is moved to its alternative position, shown in dotted lines, the left hand end of the cylinder 136 will be connected with the fluid pressure line and the right hand end will be connected with the drain line. By thus reversing the application of the pressure and drain lines to the opposite ends of the cylinder the piston 124 can be made to reciprocate in the cylinder 126 and move the planetary gears from one to the other of their respective positions. The fluid motor is so designed and dimensioned that, considering the fluid pressure in the line 134, the motor does not exert sufficient force to move the planetary gears as long as an appreciable amount of power is being transmitted between the shafts 14 and 16 so that, after the valve 132 is manipulated to accomplish a gear change the engine power control must also be manipulated to provide a sufficient interval during which substantially no power is being transmitted between the shafts 14 and 16.

The governor is driven from and controls the speed of the propeller shaft 14 and as the engine speed must be kept within certain limits it is necessary that the control be such that the propeller may rotate at a higher speed when the gear 18 is in its high speed drive than when the gear is in its low speed drive and also that the propeller does not tend to overspeed when the gear 18 is in its neutral or uncoupled condition as it might if it were permitted to windmill at a relatively flat pitch angle. In order to accomplish this object the propeller is provided with a speed adjustment interconnected with the gear shifting motor so that the speed setting of the governor will be automatically changed as the gear is shifted.

A fluid line 138 leads to the interior of the cylinder 126 at a location such that, when the piston 24 is in the portion of the cylinder 126 corresponding to a low speed ratio of the gear 18 or an uncoupled condition of the gear, the end of the fluid line 138 is connected with drain through a drain channel 140 in the piston 124 and, when the piston is in the portion of the cylinder 126 corresponding to a high speed driving connection through the gear 18, the line 138 is connected with the pressure line 134 through the conduit 128 and the interior of the cylinder 126.

The conduit 138 leads into one end of a cylindrical bore 142 within which is a piston 144 operatively connected with a valve plunger 146 and urged in a direction opposing the force of hydraulic fluid under pressure in the line 138 by a compression spring 148. The valve plunger 146 controls a connection between a fluid channel 150 leading to the space between the piston abutment 42 and the adjustable cylindrical abutment 44 and a pressure line 152 leading from the line 68, and a drain port 154. With this arrangement, when the gear 18 is in its low speed driving condition or in its uncoupled condition the fluid line 150 will be connected with the drain port 154 as shown in Fig. 2 and the piston 42 will be urged by the speeder spring 40 to the closed upper end of the movable abutment 42 thereby relieving a portion of the load on the speeder spring and automatically setting the governor for a lower speed control. When the gear 18 is in its high speed driving condition the fluid line 150 will be connected with the pressure line 152 to admit fluid under pressure to the space between the piston abutment 42 and the closed end of the movable abutment 44 to force the piston abutment in a direction to compress the speeder spring until the piston abutment contacts the limit stop 156, thus compressing the speeder spring 40 and setting the governor for a higher speed control. The variation in the loading on the speeder spring is so designed that the difference in the two speed settings of the governor is the same as the difference between the two speed drives of the gear train 18 so that the engine may continue to operate at the same speed and the governor will maintain the propeller at a speed corresponding to the gear ratio of the gear 18 in use at any particular time. This unloading of the governor speeder spring with a consequent tendency of the propeller to go to a high pitch slow speed condition also eliminates the tendency of the propeller to overspeed by windmilling with the gear 18 in its neutral or uncoupled condition.

For a more detailed description of the change speed gear and governor control reference may be had to United States Patent No. 2,365,204, issued December 19, 1944, by Erle Martin and Nelson R. Richmond, for Multi-speed governors. The present invention relates particularly to control apparatus operatively combined with the above-described control mechanism for preventing the propeller from overspeeding when the engine power is rapidly increased, as it would if the propeller were in a flat pitch condition at the beginning of the engine power increase and the power increased at a rate above the corrective rate of the governor 20 and propeller pitch changing motor. With this above described control apparatus, the propeller may still go to a flat pitch condition in its attempt to maintain the speed for which the governor is set if the engine power is reduced to a point at which the propeller speed falls below the governor speed setting. If the propeller were in such a flat pitch condition and the engine power were rapidly increased at a rate beyond the corrective rate of the governor and pitch changing motor or if the propeller speed suddenly increased as by windmilling in a dive, there would be serious danger of the propeller speed becoming dangerously high before the propeller pitch could be adjusted to correct the overspeed condition. This is particularly true in the case of a governor of the character illustrated and described above since the governor does not begin its corrective action until a propeller speed corresponding to the particular governor speed setting has been exceeded.

In the improved control arrangement the annular reaction gear 120 is mounted in the casing 122 in such a manner that it may have a limited freedom of rotational movement in the casing. This movement of the gear 120 is resisted by an expansible chamber device or torque sensitive unit, generally indicated at 158 and including a cylinder 160 rigidly secured to the engine casing and a piston 162 operatively connected with the gear 120 by suitable means, such as the piston rod 164 and the pivotal connection 166. Fluid is interposed between the piston and the closed end 168 of the cylinder 160 and the pressure of this fluid is indicative of the torque transmitted through the gear train 18 between the shafts 14 and 16. For a more complete description of a typical torque sensitive unit of the character indicated reference may be had to an article entitled "Flight testing with an engine torque meter," by A. Lewis MacClain and Richard S. Buck, in the Society of Automotive Engineers Journal for February, 1938.

A fluid line 170 leads from the fluid chamber in the torque responsive device 158 to a servo device 171 having a cylinder 172 which reciprocably receives the small portion of a double piston 174 the larger portion of which is reciprocable in a cylinder 176 the end of which is connected through a fluid channel 178 with the channel 104 leading from the servo-motor cylinder 88 to the space in the bore 96 below the compensating plunger system 94. A spring 180 in the cylinder 176 urges the piston 174 against the force of fluid under pressure in the line 170.

With this arrangement a decrease in engine torque will permit the piston 162 to rise in the cylinder 160 thereby relieving the pressure on piston 174 and permitting spring 180 to increase the space between the large end of the piston 174 and the closed end of the cylinder 176. This will remove fluid from below the compensator piston 94 and permit the plunger 92 to descend thereby raising the pilot valve 98, which will permit fluid to drain from the cylinder 70 of the servo-motor 72 through port 68 and the interior of tubular valve plunger 36 so that the servo-motor will move under the influence of the spring 78 in a direction to decrease the propeller pitch If the engine torque is increased, however, this process is immediately reversed and the pilot valve 98 will be lowered in the valve plunger 36 thereby connecting the cylinder 70 of the servo-motor with the pressure line 60 and causing the servo-motor to move in a direction to increase the propeller pitch. As the mechanism including the torque sensitive device 158 and the piston 174 acts as soon as there is an increase in engine torque and before there is a material increase in propeller speed, the propeller pitch will start to increase long before the propeller speed reaches the value at which the governor is set and the rate of increase of propeller speed is retarded to such an extent that the governor can easily take care of the speed increase as the propeller speed approaches and passes the governor speed setting. By permitting the propeller pitch to decrease as the torque decreases, this control device does not interfere with the governor control for the change speed gear and both controls will effectively perform their function in the same combination without mutual interference.

The arrangement shown in Fig. 3 is substantially the same as that shown in Fig. 1 except that the fixed pivotal support 102 of the lever 100 in Fig. 1 is replaced by a movable support 181 carried at one end of a lever 182 having a pivotal support at 184 and pivotally connected at its end opposite the pivotal support 181 with the rod 186 of a piston 188 reciprocable in a cylinder 190 between the limit stops 192 and 194.

Fluid pressure from the torque sensitive device 158 is supplied to one end of the cylinder 190 of a servo device 191 through the fluid line 170 to move the piston 188 against the force of the compression spring 196 located in the opposite end of the cylinder 190.

With this arrangement an increase in engine or propeller torque will force fluid through the line 170 and move the piston 188 towards the limit stop 194 compressing the spring 196. This movement of the piston 188 will move the lever 182 about its pivot 184 raising the pivot support 181 of the lever 100 and thus raising the pilot valve plunger 98.

Fluid pressure from the torque meter 158 is transferred through the fluid line 170 to the cylinder 190 where it holds the piston 188 against the stop 194 compressing the spring 196. During normal operation, which is the condition shown in the drawings, lever 182 forms a fixed pivot support for the lever 100 and centers the pilot valve plunger 98 in the lower port in the tubular valve plunger 36 when the flyballs 32 are substantially parallel to the axis of the shaft 30 and the governor is in its "on-speed" condition.

When a loss of torque occurs, pressure in the fluid line 170 decreases. Spring 196 then forces the piston 188 against the stop 192 raising the lever 182 and lowering the pivot 181. Lever 100 turning on its pivotal connection with the end of the plunger 92 as a pivot lowers the pilot valve plunger 98. At the same time the propeller slows down causing the flyballs 32 to move inward and lower the tubular valve plunger 36. Thus, if the pilot valve plunger 98 and the tubular valve sleeve 36 move downward at the same speed, the ports between them will not open and the propeller will not change pitch. Stop 192 is so adjusted that when the flyballs 32 have moved inward to the limit of their travel, the pilot valve plunger 98 will have moved downwardly exactly as far as the tubular valve plunger 36, causing the governor ports to remain closed as long as the torque is off. The total effect for short interruptions of torque is to lock the propeller in whatever pitch it is in when an interruption of power occurs; however, the locking is only effective in preventing the propeller from going to a lower pitch. If the propeller should tend to speed up due to windmill effect or other cause, the pitch will increase to prevent speeding up but, should the propeller tend to slow down, the pitch will not decrease because the governor ports cannot open to drain. Thus an overspeed limit is set up on the loss of engine torque and the speed to which the propeller is limited is lower than the set speed of the governor by the amount of speed changes caused by moving the pilot valve plunger a distance corresponding to the inward limit of flyball travel. This will depend on the speeder spring-flyball rate ratio.

The effect of this limit control on gear shifting mechanism would be to cause the shifting of the gears to take place at a somewhat lower speed than in the combination shown in Fig. 1.

When the torque is re-established after an interruption the pilot valve is returned to its normal position and the governor set back to its normal speed which, as pointed out above, is higher than its limit speed. If the pilot valve return is instantaneous or faster than the engine increases in speed the propeller ports will be opened to decrease the propeller pitch. Under some conditions this might result in some overspeeding of the propeller but this could be prevented by suitable retarding means such as by making the lower end of the piston 188 a dashpot which would allow the piston to move upward instantaneously but move downward slowly with an increase of engine torque.

The arrangement shown in Fig. 4 is also similar to that shown in Fig. 1 with the exception that the compensator pilot valve is not utilized to change the governor speed setting and to control the servo-motor but instead a change in the speed setting of the governor by changing the speeder spring setting only is depended upon to accomplish this purpose. In this arrangement an additional piston 198 is interposed between the piston abutment 42 and the adjustable cylindrical abutment 44. The gear shift control line 150 is led to the space between the piston abutment 42 and the closed end of the hollow intermediate piston 198 and the torque meter pressure line 170 is led to the space between the intermediate piston 198 and the closed end of the manually adjustable cylindrical abutment 44.

With this arrangement, when the engine is operating under power, or torque is otherwise being transmitted between the shafts 14 and 16, the intermediate piston 198 will be held in position with its lower end against the stop 156 of the outer cylindrical abutment, as illustrated in the drawings, and the position of the inner piston 42 relative to this intermediate piston will be controlled by the gear shift motor in the manner explained above. This position of the piston 198 against the stop 156 will provide a minimum low speed setting for the governor while the engine is operating in gear and transmitting substantial torque to the propeller. When there is a loss of torque and consequent loss of pressure in the fluid line 170 the piston 198 will rise in the cylinder 44 relieving the loading on the governor speeder spring 40 and resetting the governor to a lower speed setting. If now the torque is re-established, the governor will be initially set for a lower speed and will thus begin to correct for the increasing speed by increasing the propeller pitch angle before such correction would have been initiated with the governor in its normal speed setting. It is necessary that the application of pressure through the line 170 to the piston 198 lag somewhat behind the increasing speed of the propeller as the torque increases and to this end it may be found desirable to include a restriction in the line 170 or some other part of this portion of this hydraulic system.

In the arrangement shown in Fig. 2 the operation is the same as that of the device shown in Fig. 1 with the exception that a manifold torque pressure responsive element 200 is substituted for the hydraulic device 158 directly responsive to engine shaft torque. The device 200 may comprise an expansible chamber device in the form of a bellows or Sylphon interiorly connected with the engine intake system by a fluid conduit 202. The upper end of the bellows 200 is held in fixed position by a suitable bracket 204 and the movable lower end carries a valve stem 206 which projects into a relay or servo valve generally indicated at 208. This relay valve comprises two tandem cylinders 210 and 212 separated by a diaphragm 214 and containing a plunger generally indicated at 216 having a piston 218 in the cylinder 210 and a piston 220 in the cylinder 212. The valve plunger 206 is reciprocable in a bore in the piston plunger 216 and acts to control the fluid valves 222 and 226. A pressure fluid line 228 leads from the line 60 to the upper end of the cylinder 210 and a drain port 230 leads from the upper end of the cylinder 212 above the piston 220. An extension 232 on the piston plunger 216 extending through the upper end of the cylinder 210 provides a differential area on opposite sides of the piston 218 the effective area on the lower side of this piston being greater than the effective area on the upper side thereof. The valve 222 controls the flow of fluid under pressure from the line 228 and through the channels 223 and 224 to the space below the piston 218 while the valve 226 controls the flow of fluid through the channels 224 and 227 from the space below the piston 218 to the exhaust port 230.

With this arrangement when a loss of torque occurs as evidenced by a loss of manifold pressure the valve plunger 206 will rise admitting hydraulic fluid from the pressure line 228 to the underside of the piston 218 causing the piston plunger 216 to rise and the compensating plunger 92 to descend thereby raising the pilot valve plunger 98 maintaining the governor valve drain ports closed and preventing the propeller from going to a flat pitch condition in the manner explained in connection with the description of Fig. 1. When the torque again increases as evidenced by an increase in manifold pressure, the valve plunger 206 will be forced downwardly connecting channels 224 and 226 with the drain port 230 thus permitting the piston plunger 216 to descend under the fluid pressure admitted through the line 228. The piston plunger 216 will descend until it reaches a limiting position with the piston 220 against the lower end of the cylinder 212 and the plunger 98 will reassume its normal or neutral position under the influence of the spring 146. The relay valve 208 is provided in order to provide a definite force acting on the compensating plunger 92 and to prevent movements of the piston 90 in the cylinder 88 from moving the piston controlled by the manifold pressure responsive element 200.

While a suitable mechanical embodiment in several modified forms has been hereinabove described and illustrated in the accompanying drawings, for the purpose of disclosing the invention, it is to be understood that the invention is not limited to the particular embodiment so illustrated and described, but that such changes in the size, shape and arrangement of the various parts thereof may be resorted to as come within the scope of the subjoined claims.

Having now described the invention so that others skilled in the art may clearly understand the same, what it is desired to secure by Letters Patent is as follows:

1. In combination with an aircraft power plant including a controllable pitch propeller, an engine having a predetermined range of torque values, and a speed governor regulating the propeller pitch, governor speed setting means having a limited range defined by a high speed position and a low speed position, engine torque responsive means operatively connected with said speed setting means to determine the position of said setting means, said speed setting means being movable through its entire range by a torque change less than said torque range and said speed setting means and said torque responsive means constructed and arranged to maintain said setting means at its high speed position for all torque values above a predetermined amount in the upper portion of said torque range and to maintain said setting means at its low speed position for all torque values below a predetermined amount in the lower portion of said torque range.

2. In combination with an engine, an engine driven variable load device, and a governor having means for selecting the speed to be maintained and operative to maintain the speed of said engine substantially constant at said selected speed by varying the load imposed on said engine by said variable load device, said governor requiring a time interval for varying said load proportional to the required amount of load change, means for preventing overspeeding of said engine by an increase of torque at a rate greater than the load increasing capacity of said speed responsive means, said overspeed preventing means comprising, mechanism responsive to engine torque variation within a predetermined range, and means actuated by said torque responsive mechanism to provide an acceleration resisting load in advance of the attainment of said selected engine speed.

3. In combination with an aircraft power plant including a controllable-pitch propeller, a propeller driving engine developing a predetermined range of torque values and speed responsive means regulating the pitch of said propeller to control the speed of said power plant to maintain a substantially constant preselected speed independently of torque values, means responsive to variations in the torque of said engine, and means actuated by said torque responsive means and operatively connected with said speed responsive means to reset said speed responsive means for a lower speed setting when said torque decreases below a predetermined value in the lower portion of said range.

4. In combination with an aircraft power plant including a controllable-pitch propeller, a propeller driving engine and speed responsive means regulating the pitch of said propeller to maintain the speed of said power plant at a selected speed, said means having a lower pitch regulating limit at which the speed responsive means is rendered ineffective to reduce the propeller pitch, means responsive to variations in engine torque, and means actuated by said torque responsive means and operatively connected with said speed responsive means to set said speed responsive means at its lower limit to thereby restrain the pitch of said propeller from changing below a predetermined pitch angle when the engine torque decreases to a value below that necessary to rotate the propeller at said selected speed.

5. In combination with an aircraft power plant including a controllable-pitch propeller, a propeller driving engine and speed responsive means regulating the pitch of said propeller to control the speed of said power plant, a variable volume device responsive to variations in engine torque, means having a limited travel for resetting said speed responsive device, means limiting the travel of said resetting device, said variable volume device and said resetting means being operably connected and including means for moving said resetting means to one of its limiting positions to provide a low speed setting for said speed responsive device whenever the engine torque decreases below a predetermined value.

6. In combination with a power plant including a controllable-pitch propeller, a propeller driving engine, and a speed governor driven by said power plant and including a propeller pitch controlling valve and a cut-off valve for said pitch controlling valve, an expansible chamber device responsive to variations in engine torque, and means operatively connecting said expansible chamber device with said cut-off valve to hold said cut-off valve in position to restrain said propeller against pitch decrease whenever said engine torque is below a predetermined value.

7. In combination with a power plant including a controllable-pitch propeller, a propeller driving engine, and a speed governor driven by said power plant and including a propeller pitch controlling valve and a cut-off valve for said pitch controlling valve, an expansible chamber device responsive to variations in engine torque, and means operatively connecting said expansible chamber device with said cut-off valve to move said cut-off valve to a pitch increasing position upon an increase in engine torque.

8. In a power plant including an engine, an engine driven controllable-pitch propeller and a speed governor operatively connected with said propeller to regulate the propeller pitch and thereby maintain the speed of said power plant substantially constant at a selected value, said governor having a speeder spring, a piston bearing upon said spring, a variable volume device having an element movable in response to engine torque variations hydraulically connected with said piston for moving said piston a predetermined limit amount and increasing the load on said spring whenever said engine torque exceeds a predetermined value said piston reaching its limit of movement when the engine torque reaches a predetermined higher value less than the maximum torque of the engine.

9. In a power plant including an engine having a range of torque values, an engine driven controllable-pitch propeller, and a speed governor operatively connected with said propeller to maintain the speed of said power plant substantially constant at a selected value by regulating the pitch of said propeller, said governor having a speeder spring and a set of centrifugal flyballs acting against said spring, a first variable volume device having a movable element operatively associated with said spring to change the loading thereon, stops for limiting the movement of said movable element, a second variable volume device responsive to variations in engine torque, and a hydraulic connection between said first and second variable volume devices for transmitting fluid from one device to the other for moving said movable element from one stop to the other stop and increasing the loading on said spring upon a predetermined limited increase in engine torque in the lower portion of said range of torque values.

10. In a power plant including an engine for delivering a predetermined range of torque values, an engine driven controllable-pitch propeller, and a speed governor operatively connected with said propeller to maintain the speed of said power plant substantially constant at a selected value by regulating the pitch of said propeller, means operatively associated with said governor and movable to different positions to vary the speed setting of said governor, hydraulic means operatively connected with said first mentioned means to change the position thereof, hydraulic means operatively associated with said engine to apply to hydraulic fluid a pressure varying in proportion to variations in engine torque, and a hydraulic connection between said two hydraulic means to render said first mentioned hydraulic means effective to change the speed setting of said governor when said engine torque reaches substantially a predetermined value in said range, said first mentioned hydraulic means being ineffective to change the speed setting of said governor upon changes in torque values in said range above and below said predetermined value.

11. In a power plant including an engine, an engine driven hydro-controllable propeller, a valve for controlling the flow of hydraulic fluid to and from said propeller, a speed governor controlling said valve to maintain the speed of said power plant substantially constant at a predetermined rate, a movable element operative to change the speed setting of said governor, and a hydraulic device operatively connected with said movable element to hold said element stationary and to move said element and change the speed setting of said governor, a hydraulic device operatively associated with said engine effective to apply to hydraulic fluid a pressure variable in proportion to variations in engine torque, a servo device hydraulically connected with said engine associated device and operated thereby, and an operative connection between said servo device and said first mentioned hydraulic device to render said first mentioned hydraulic device operative to temporarily change the speed setting of said governor.

12. In a power plant including an engine, an engine driven hydro-controllable propeller, a valve for controlling the flow of hydraulic fluid to and from said propeller, a speed governor controlling said valve to maintain the speed of said power plant substantially constant at a predetermined rate, a movable valve element operative to change the speed setting of said governor, and a hydraulic device operatively connected with said movable valve element for holding said element stationary and for moving the same, a hydraulic device operatively associated with said engine effective to apply to hydraulic fluid a pressure variable in proportion to variations in engine torque, a servo device hydraulically connected with said engine associated device and operated thereby, and an operative connection between said servo device and said first mentioned hydraulic device to render said first mentioned hydraulic device and the movable valve element operatively associated therewith effective to cut off said controlling valve and thus prevent a further decrease of propeller pitch after said engine torque has decreased to a predetermined value.

13. In a power plant including an engine, an engine driven hydro-controllable propeller, a valve for controlling the flow of hydraulic fluid to and from said propeller, a speed governor controlling said valve to maintain the speed of said power plant substantially constant at a predetermined rate, a movable valve element operative to change the speed setting of said governor, and a hydraulic device operatively connected with said movable valve element for holding said element stationary and for moving the same, a hydraulic device operatively associated with said engine effective to apply to hydraulic fluid a pressure variable in proportion to variations in engine torque, a servo device hydraulically connected with said engine associated device and operated thereby, and an operative connection between said servo device and said first mentioned hydraulic device to render said first mentioned hydraulic device and the movable valve element operatively associated therewith effective to open said controlling valve and initiate a pitch increase when said engine torque increases and before the speed of said power plant has varied from said predetermined rate.

14. In combination with an aircraft power plant including a controllable pitch propeller, an engine having a predetermined range of torque values, and a speed governor, having means for selecting the speed to be maintained, for maintaining a preselected engine speed at different torque values by regulating the propeller pitch, means for preventing overspeeding of said engine upon a sudden increase in torque from a torque value below a predetermined amount in the lower portion of said torque range comprising additional governor speed setting means having a limited range defined by a high speed position and a low speed position, said governor maintaining said preselected speed when said setting means is in its high speed position, engine torque responsive means operatively connected with said speed setting means to determine the position of said setting means, said speed setting means being movable through its entire range by a torque change less than said torque range, and said speed setting means and said torque responsive means constructed and arranged to maintain said setting means at its high speed position for all torque values above a predetermined amount in the upper portion of said torque range and to maintain said setting means at its low speed position for all torque values below a predetermined amount in the lower portion of said torque range.

15. In combination with an aircraft power plant including a controllable pitch propeller, and an engine having a range of torque values, a speed governor controlling the engine speed by regulating the propeller pitch, said governor having means for selecting the speed to be maintained and operative to maintain the speed of said engine substantially constant at said selected speed at different torque values, said governor requiring a time interval for varying said propeller pitch dependent upon the required amount of pitch change, means for preventing overspeeding of said engine by an increase of torque at a rate greater than the load increasing capacity of said governor, said overspeed preventing means comprising mechanism responsive to engine torque variations within a predetermined range and means actuated by said torque responsive mechanism to initiate a change in propeller pitch to provide an acceleration resisting load.

16. In combination with an aircraft power plant including a controllable pitch propeller, and an engine having a range of torque values, a speed governor including governor controlled valve means controlling the engine speed by regulating the propeller pitch, said governor having means for selecting the speed to be maintained and operative to maintain the speed of said engine substantially constant at said selected speed at different torque values, said governor requiring a time interval for varying said propeller pitch dependent upon the required amount of pitch change, means for preventing overspeeding of said engine by an increase of torque at a rate greater than the load increasing capacity of said governor, said overspeed preventing means comprising mechanism responsive to engine torque variations within a predetermined range and means actuated by said torque responsive mechanism to move said governor controlled valve means and provide a change in propeller pitch to provide an acceleration resisting load before substantial movement of said valve means by said governor.

17. The combination with an aircraft power plant including a controllable pitch propeller, an engine, and a speed governor, including governor controlled valve means, for controlling the engine speed by regulating the propeller pitch, said governor having means for selecting the speed to be maintained by said engine and operative to maintain the speed of said engine substantially constant at said selected speed at different torque values, of torque responsive means actuated by a change in torque of said engine, means operatively connecting said torque responsive means and said valve means to render said valve means responsive to said engine torque and thereby position said propeller blades controlled by said valve means to anticipate the effect of an increase in torque of said engine and prevent the engine from substantially exceeding said selected speed.

18. In combination with an aircraft power plant including a controllable pitch propeller, a propeller driving engine and speed responsive means regulating the pitch of said propeller to control the speed of said power plant, means responsive to variations in the torque of said engine and means preventing overspeeding of said power plant upon an increase in engine torque including means actuated by said torque responsive means and operatively connected with said speed responsive means to reset said speed responsive means to a lower speed setting when said torque increases.

ERLE MARTIN.